(12) United States Patent
Tate et al.

(10) Patent No.: US 7,864,789 B2
(45) Date of Patent: Jan. 4, 2011

(54) SIGNALING METHODS FOR TELECOMMUNICATON SYSTEM FOR EXCHANGING FRAMES OVER ETHERNET INTERFACES AND DEVICES FOR IMPLEMENTING SUCH METHODS

(75) Inventors: Michael Tate, Mouans Sartoux (FR); Geoffrey Mattson, Nashua, NH (US); Simon Bryden, La Roquette sur Siagne (FR); Robert Pluim, Biot (FR)

(73) Assignee: Ciena Corporation, Linthicum, MD (US)

( * ) Notice: Subject to any disclaimer, the term of this patent is extended or adjusted under 35 U.S.C. 154(b) by 1845 days.

(21) Appl. No.: 10/185,101

(22) Filed: Jun. 28, 2002

(65) Prior Publication Data
US 2003/0185223 A1    Oct. 2, 2003

(30) Foreign Application Priority Data
Mar. 28, 2002    (EP)    ................................. 02290783

(51) Int. Cl.
*H04L 12/28*    (2006.01)
(52) U.S. Cl. ...................................... 370/410; 370/216
(58) Field of Classification Search .................. 370/410
See application file for complete search history.

(56) References Cited

U.S. PATENT DOCUMENTS

| | | | |
|---|---|---|---|
| 5,715,386 A * | 2/1998 | Fulton et al. .................... 714/38 |
| 6,041,358 A * | 3/2000 | Huang et al. ................. 709/238 |
| 6,226,771 B1 * | 5/2001 | Hilla et al. .................. 714/758 |
| 6,389,130 B1 * | 5/2002 | Shenoda et al. ........ 379/221.08 |
| 6,560,216 B1 * | 5/2003 | McNiff et al. ................ 370/349 |
| 6,813,250 B1 * | 11/2004 | Fine et al. .................... 370/256 |
| 6,873,602 B1 * | 3/2005 | Ambe ......................... 370/254 |
| 6,944,159 B1 * | 9/2005 | Fotedar et al. ............... 370/392 |
| 7,286,490 B2 * | 10/2007 | Saleh et al. .................. 370/254 |
| 7,349,326 B1 * | 3/2008 | Zadikian et al. ............. 370/216 |
| 2002/0090007 A1 * | 7/2002 | Kamiya et al. .............. 370/476 |
| 2002/0176450 A1 * | 11/2002 | Kong et al. .................. 370/539 |
| 2005/0180345 A1 * | 8/2005 | Meier .......................... 370/310 |

OTHER PUBLICATIONS

American National Standard for Telecommunications—Generic Framing Procedure, 2001, T1X1.5/2000-024R3.*

(Continued)

*Primary Examiner*—Chi H Pham
*Assistant Examiner*—Mohammad S Adhami
(74) *Attorney, Agent, or Firm*—Christopher & Weisberg, P.A.

(57) ABSTRACT

A platform is connected over a synchronous network using a GFP encapsulation scheme to a provider device having a first Ethernet interface with a customer device, said platform being arranged for exchanging tagged frames including a virtual LAN identifier (VID) with a service unit over a second Ethernet interface. If an error condition is detected at a GFP port of the platform, a correspondence is retrieved between said GFP port and a VID and a deregistration message including said VID is forwarded to the service unit. If an error condition is detected at the second Ethernet interface responsive to reception of a deregistration message including a VID from the service unit, a correspondence is retrieved between said VID and a GFP port and said deregistration message is forwarded through said GFP port to the provider device in a GFP error message. When several Ethernet interfaces concentrated by a bridge face the provider device, another VID is taken into account in the correspondence retrieving.

18 Claims, 6 Drawing Sheets

OTHER PUBLICATIONS

T1X1.5/2000-024R3 (Draft ANSI T1.xxx.YY6200X)—American National Standard for Telecommunications—Generic Framing Procedure.

IEEE Std 802;1Q-1998—Local and Metropolitan Area Networks (Section 11)—IEEE 1999.

* cited by examiner

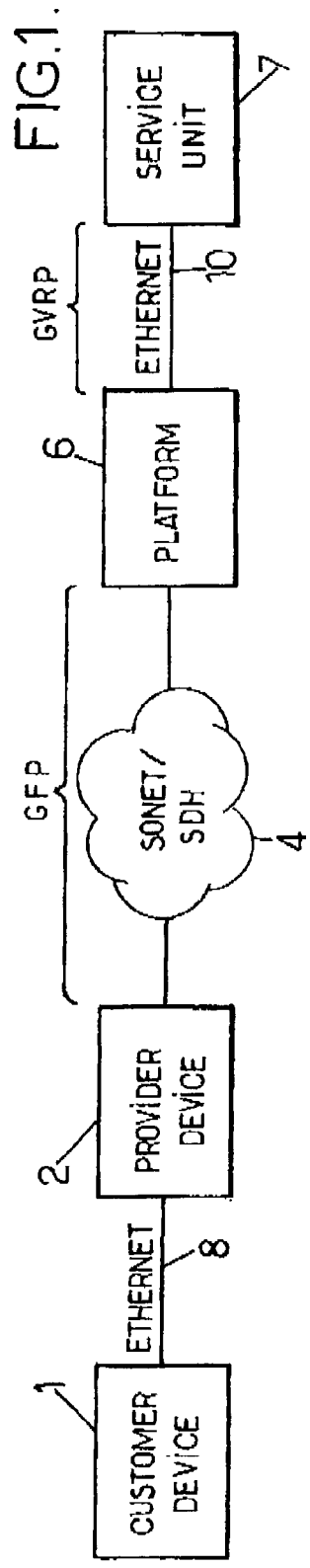
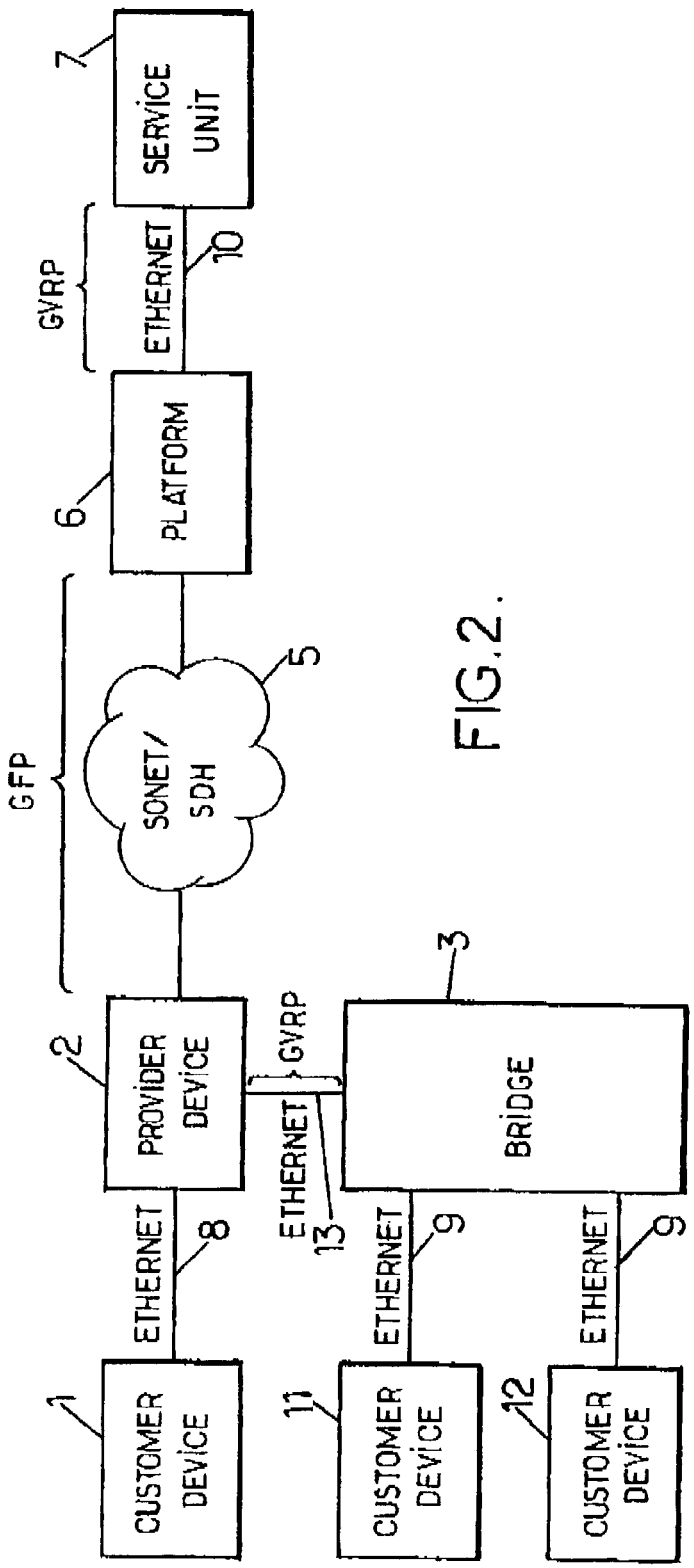

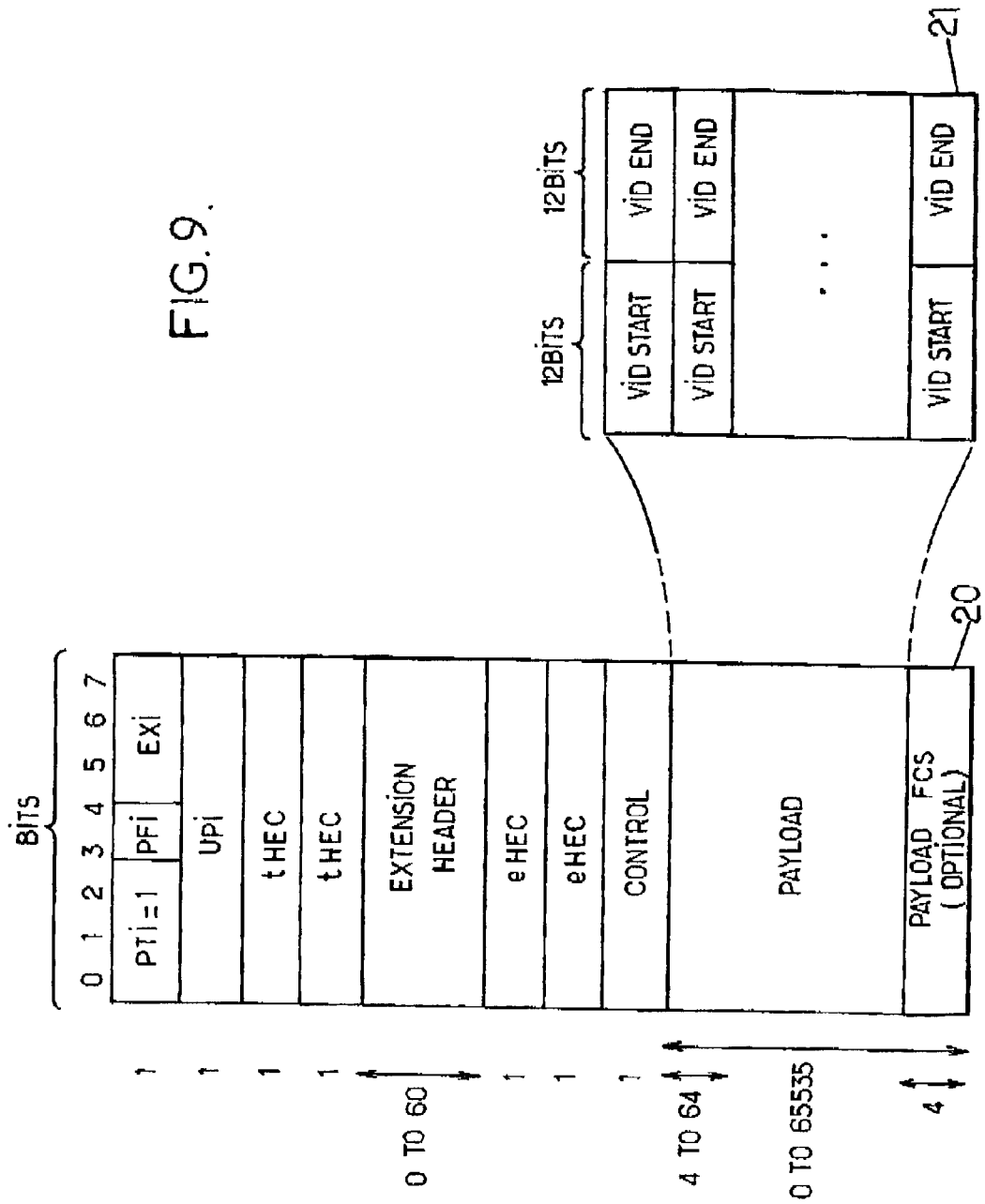

SIGNALING METHODS FOR TELECOMMUNICATON SYSTEM FOR EXCHANGING FRAMES OVER ETHERNET INTERFACES AND DEVICES FOR IMPLEMENTING SUCH METHODS

BACKGROUND OF THE INVENTION

The present invention relates to signaling methods for reporting on the status of interfaces through a carrier network. It particularly concerns status signaling for Ethernet interfaces over a SONET/SDH network (Synchronous Optical Network/Synchronous Digital Hierarchy).

In a telecommunication system, such signaling is essential to inform different units that a failure has occurred somewhere on a communication path. It can help a switch for instance to use a different path to circumvent a failed link or equipment. It can also increase the quality of service by not repetitively sending frames to an out-of-service end.

Such signaling is available in many telecommunication systems having a single protocol which integrates specific messages and mechanisms to inform the different network entities of encountered failures.

When the system implemented supports several protocols on different portions, there is a need to adapt the frames from one portion to the characteristics of the other. This can be accomplished with a frame encapsulation mechanism. A procedure called GFP (Generic Framing Procedure) has been recently defined for this purpose by the American National Standards Institute (ANSI) and can be found in the recent draft specification T1x1.5/2000-024R3. It is aimed at defining a generic mechanism to adapt traffic from high-layer client signals over an octet synchronous transport network. For instance it can provide a mapping between some Ethernet frames, as defined in the standard IEEE 802.3, and a SONET/SDH layer. However, GFP does not allow such mapping and transmission for status information about an end-point, like error messages as defined in the IEEE 802.3 Ethernet protocol.

Moreover, as specified in the IEEE standard 802.1Q approved in December 1998, Ethernet networks may support one or more Virtual Local Area Networks (VLANs). An Ethernet frame circulating in such a network may include, after a Medium Access Control (MAC) address, an additional field called tag header or Q-tag which contains a VLAN identifier (VID). Accordingly, a VLAN-aware Ethernet bridge has the ability to perform frame switching based on the VID, deduced either from the physical port from which the incoming frame is received or from the contents of its tag header. A VLAN is used for the layer 2 broadcasting and forwarding of frames within a sub-group of users (subscribers of that VLAN). For example, in a corporation, it is possible to define respective virtual LANs for various departments to enable selective broadcasting and forwarding of information in the layer 2 procedures.

Although Ethernet frames tagged according to the standard 802.1Q can be transported by GFP, nothing is available to allow the signaling of the failure, the removal or the addition of individual VLANs.

An object of this invention is to improve this situation by allowing the signaling of Ethernet VLAN status using GFP.

Another object of the present invention is to define a simple mechanism for signaling of complete Ethernet interface failure through a synchronous network, which does not require modifying Ethernet standards.

SUMMARY OF THE INVENTION

The invention proposes a signaling method for a telecommunication system comprising a platform connected over a synchronous network using a GFP encapsulation scheme to a provider device having a first Ethernet interface with a customer device, said platform being arranged for exchanging tagged frames including a virtual LAN identifier (VID) with a service unit over a second Ethernet interface. In one embodiment, the method comprises the following steps:

detecting an error condition at a GFP port of the platform;
retrieving a correspondence between said GFP port and a VID; and
forwarding a deregistration message including said VID to the service unit.

In this way, it is possible to inform the service unit that an error may have occurred on the distant first Ethernet interface.

In an alternative embodiment, the signaling method comprises the following steps:

detecting an error condition at the second Ethernet interface responsive to reception of a deregistration message including a VID from the service unit;
retrieving a correspondence between said VID and a GFP port; and
forwarding said deregistration message through said GFP port to the provider device in a GFP error message.

In this way, it is possible to inform the first Ethernet interface that an error may have occurred on a service unit port.

Another aspect of the invention concerns a signaling method for a telecommunication system comprising a provider device arranged for exchanging tagged frames with a bridge arranged for exchanging frames over at least two Ethernet interfaces with respective customer devices, said tagged frames including at least one VID corresponding to a respective Ethernet interface. The system further comprises a platform connected to the provider device over a synchronous network using a GFP encapsulation scheme. The platform is arranged for exchanging tagged frames including at least one VID with a service unit over a second Ethernet interface. In one embodiment, the method comprises the following steps:

detecting an error condition on a GFP port of the platform responsive to reception from the provider device of at least one GFP error message including a first at least one VID;
retrieving a correspondence between said GFP port and said first at least one VID on the one hand, and a second at least one VID on the other hand; and
forwarding a deregistration message including said second at least one VID to the service unit.

In this way, the invention allows the service unit to be informed of a failure on a particular distant Ethernet interface in a multipoint-to-point system architecture.

In an alternative embodiment, the signaling method comprises the following steps:

detecting an error condition at the second Ethernet interface responsive to reception of a deregistration message including a first at least one VID from the service unit;
retrieving a correspondence between said first at least one VID on the one hand and a GFP port and a second at least one VID on the other hand;
forwarding said deregistration message through said GFP port to the provider device in a GFP error message including said second at least one VID; and at the provider device, forwarding said GFP error message to the bridge in an error message including said second at least one VID.

In this way, the invention allows a particular Ethernet interface to be informed of a failure on a corresponding service unit port.

The invention further proposes a platform for a telecommunication system, including means for carrying out the steps of a signaling method as defined above.

The invention also proposes a provider device for a telecommunication system comprising a platform connected to the provider device over a synchronous network using a GFP encapsulation scheme, said provider device being arranged for exchanging tagged frames with a bridge having at least two Ethernet interfaces with respective customer devices, said tagged frames including at least one VID corresponding to a respective Ethernet interface. The provider device according to the invention comprises:

means for receiving at least one error message from the bridge, including at least one VID;
a correspondence table for retrieving a correspondence between said at least one VID and at least one GFP port;
means for forwarding said at least one error message in at least one GFP error message including said at least one VID, through said at least one GFP port to the platform over said synchronous network.

Status transmission can be used in a connection establishment process in a unusual way by regularly transmitting errors on a path between distant Ethernet interfaces and considering that a connection is established between them when no new error is transmitted on the path.

Every mentioned GFP error message that contains a VID information can be coded in a way that includes the VID values in the payload field of such message. In a preferred embodiment, VIDs are coded as ranges of contiguous values.

The preferred features of the above aspects which are indicated by the dependent claims may be combined as appropriate, and may be combined with any of the above aspects of the invention, as would be apparent to a person skilled in the art.

BRIEF DESCRIPTION OF THE DRAWINGS

FIG. 1 is a schematic representation of a system implementing a method according to the invention.

FIG. 2 is a second schematic representation of a system implementing a second method according to the invention.

FIG. 9 is a format example for a GFP error message according to the invention.

DESCRIPTION OF PREFERRED EMBODIMENTS

Figure 3:
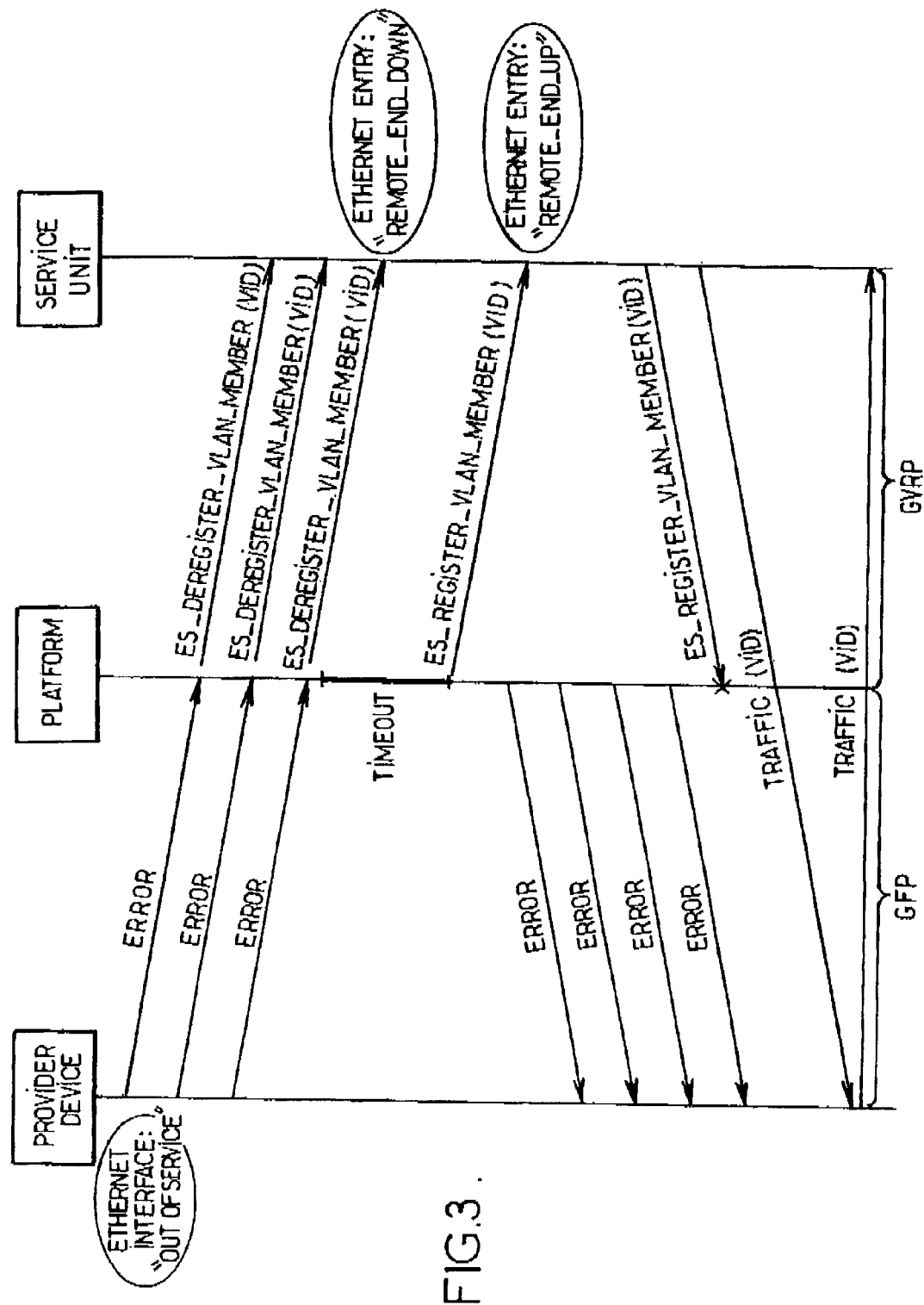
FIG. 3 is a diagram illustrating steps for establishing a connection according to the invention with a system as shown on FIG. 1.

The invention is illustrated here in its currently preferred application to a system wherein end points are Ethernet interfaces being interconnected over a carrier network supporting a SONET/SDH technology using a GFP encapsulation scheme.

FIG. 1 illustrates a system implementing a first aspect of the invention. It shows a customer device 1 connected to a provider device 2 over an Ethernet interface 8. This Ethernet interface 8 is a link supporting the Ethernet standard protocol IEEE 802.3. It can also use an IEEE 802.1Q protocol by exchanging tagged frames including virtual local area network identifiers (VIDs). In this second case, the tag management is a local matter that has no impact on the present invention and thus which will not be further detailed here. The provider device 2 is typically a network termination unit that can be owned by a provider. It is connected to a SONET/SDH network 4. Such network is particularly used for optical telecommunications transmission.

A platform 6 is also connected to the synchronous network 4. This unit terminates multiple transmission technology types and provides switching functionality within that technology. It also provide network interworking. The platform is connected to a service unit 7 over a IEEE 802.1Q Ethernet interface 10 that supports tagged frame exchanges. The service unit 7 is a system that provides value added Ethernet-based services.

In a provisioning phase, the provider device 2 is provisioned with an Ethernet physical interface 8. It is also provisioned to establish a SONET/SDH path to the platform supporting the above-mentioned GFP encapsulation and signaling scheme. The platform is provisioned to establish a connection with the provider device 2 at the SONET/SDH layer providing a GFP signaling and forwarding path between the provider device 2 and the platform 6. The platform Ethernet interface 10 is provisioned with a table which associates a GFP port to a series of VIDs. In the example illustrated on FIG. 1, the correlation would be one GFP port for one VID. Finally, the service unit 7 is also provisioned with a corresponding set of VIDs and the appropriate service is provisioned onto those interfaces.

It is assumed now that a valid SONET/SDH path has been created between the provider device 2 and the platform 6 according to the provisioning rules specified above.

Errors may be caused by many different components in the system. Any error condition detected should be propagated to the other components causing them to temporarily take out of service the affected section of the path and begin a monitoring process for the component recovery in order to bring the path into service again.

Figure 4:
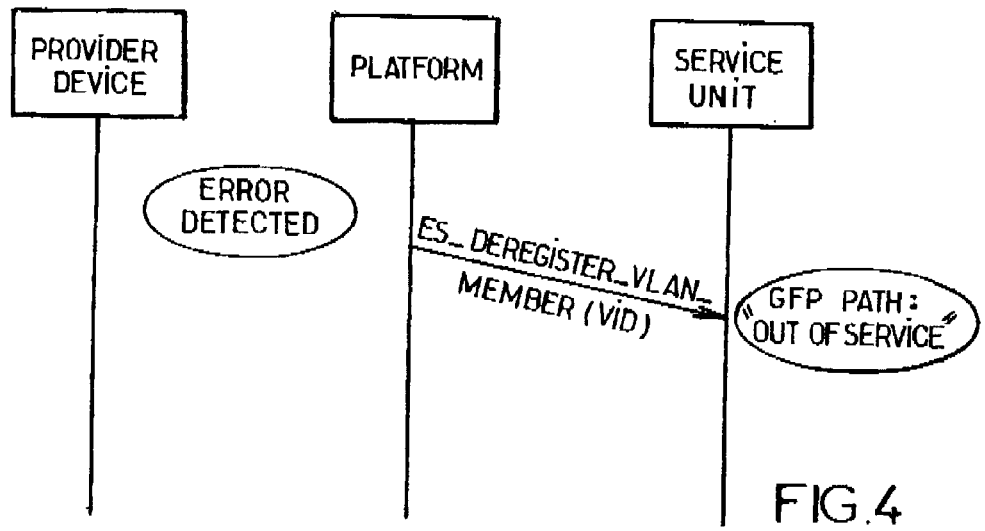
FIGS. 4 and 5 are diagrams illustrating error conditions with a system as shown on FIG. 1.

Such errors can occur in any section of a path. FIGS. 3 and 4 show examples where an error occurs on the Ethernet interface 8 or on the path between the provider device 2 and the platform 6. But an error can also follow a deliberate port deactivation from the service unit 7 as shown on FIG. 5, in order to take this port out-of-service.

Let us first consider the case of an error occurring between Ethernet interface 8 and the platform 6. On FIG. 3, an error occurs on the Ethernet interface 8. It is indicated to the platform 6 from the provider device 2 by generating and transmitting one or more GFP error messages. Such a GFP error message contains a destination GFP port in a field called extension header. The different types of extension headers are presented in section 6.4 of the above-mentioned GFP standard T1×1.5/2000-024R3. When using a point-to-point model as is the case between the provider device 2 and the platform 6, an extension format for linear frames can be used. First half of sixth octet is reserved for coding the destination port. The platform 6 thus receives the message on the specified GFP port, say "g". Upon reception of such message, the platform 6 is aware of the fact that the path corresponding to Ethernet interface 8 is out-of-service. The platform then performs a lookup in its GFPNID table. This lookup reveals a correspondence between the GFP port "g" and the VID, say "v", corresponding to the virtual LAN the Ethernet interface 8 belongs to. Actually, the correspondence can be based on further identifiers carried in the GFP OA&M (Operations, Administration & Maintenance) element where configuration has been predefined. Then, the platform 6 creates a message to be sent to the service unit 7 through the Ethernet interface 10. This message is ES_DEREGISTER_ VLAN_MEMBER (VID) and is defined in the GVRP protocol (GARP (Generic attribute registration protocol) VLAN Registration Protocol)) specified in section 11.2 of the standard IEEE 802.1Q. It contains the value "v" for the VID. Upon reception of such GVRP message, the service unit 7 is informed of the error and sets the corresponding Ethernet forwarding table entry (indexed by the VID) to state REMOTE_END_DOWN ensuring that the provisioned service on that port is not available.

The same process is performed for instance when an error occurs on the provider device 2. No GFP error message is received at the platform 6 in this case, but the same GVRP message creation and transmission will inform the service unit 7 that the GFP path is out-of-service, as schematized on FIG. 4. Actually, the same process can be performed whenever an error is detected for a path. At the provider device side, an implementer may choose to take the Ethernet port associated to the GFP path "out-of-service".

If frames exchanged on the Ethernet interface 8 are tagged according to the standard IEEE 802.1Q, the tag will be received by the platform 6. The latter will copy it to an additional header in the frame and insert the predefined 802.1Q encapsulation header, that is to say the retrieved VID value ("v" in the previous example), into the standard header position.

Figure 5:
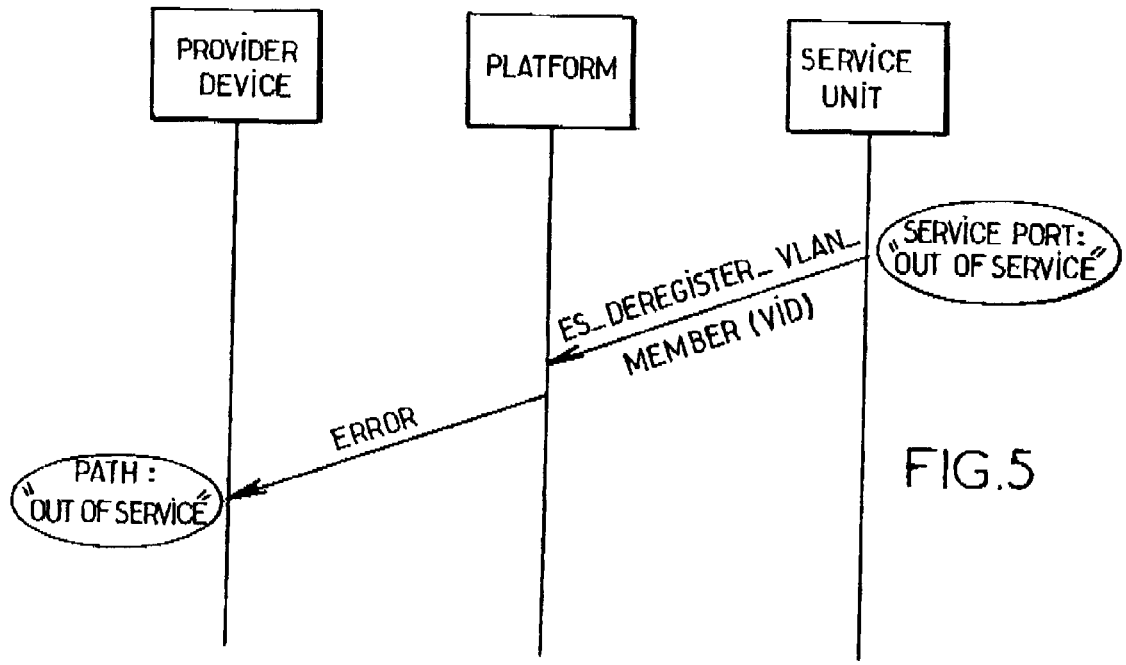

FIG. 5 shows the inverse process when the service unit 7 has initiated the error propagation. This can occur when the service unit deliberately deactivates a port. As previously, it sends an ES_DEREGISTER_VLAN_MEMBER(VID) message, including a VID value, to the platform 6. The latter will perform a lookup in its table and will deduce a GFP port corresponding the received VID value. On that basis, the platform will send a GFP error indication through the retrieved GFP port to the provider device 2, so that it knows that the corresponding path can be considered as out-of-service.

FIG. 3 illustrates a way of establishing an end-to-end connection from the error transmission principles described above in a system configuration as shown on FIG. 1. The provider device 2 verifies that its local Ethernet interface 8 state is "in-service". Until this occurs, it generates GFP error indications which will be forwarded to the platform 6 to advise it that the connection is out-of-service. Responsive to the reception of each GFP error message at the platform, a timer, the value of which can be predetermined, is started. It is reset when a new GFP error message is received at the platform. At least some of the error indications are forwarded to the service unit 7 in ES_DEREGISTER_VLAN_MEMBER(VID) messages, after a lookup in the correspondence table between GFP ports and VIDs. Once the provider device 2 has stopped sending GFP error indications, the timer will expire. Upon that expiry, the platform 6 sends a GVRP message ES_REGISTER_VLAN_MEMBER (VID), including the VID value retrieved from the table ("v" in the previous example), to the service unit 7. This message causes marking of REMOTE_END_UP in the service unit for the corresponding Ethernet forwarding table entry ensuring that the connection is established in the uplink direction, that is from the provider device 2 to the service unit 7.

After sending an ES_REGISTER_VLAN_MEMBER (VID) message to the service unit 7, the platform will start sending GFP error indications to the provider device 2 through the GFP port ("g") corresponding to the VID ("v") included in the GVRP message. Those GFP error indications can also be sent before reception of the GVRP message, when no connection is established on the corresponding path in the downlink direction. When the platform 6 receives one or more ES_REGISTER_VLAN_MEMBER (VID) messages from the service unit 7, including a VID corresponding to the one of the provider device 2, it stops sending GFP error indications to the provider device. The latter which does not receive error indications any more, for instance upon expiry of another timer as for the uplink, the connection can be considered as established in the downlink direction, that is from the service unit 7 to the provider device 2. Bi-directional communication is now established and traffic can be forwarded from an Ethernet interface to the other (8 and 10).

The GFP error indications previously mentioned are carried by classical GFP user frames. Those GFP user frames carry far-end client signal failure indications as described in section 6.3.7 of the GFP draft specification T1×1.5/2000-024R3. Payload area of such frames is shown on the left part of FIG. 9 (frame 20). A frame is composed of two main parts: a payload header made of the first octets fields and the payload itself optionally followed by a Frame Check Sequence (FCS). Each field and its role is detailed in the GFP specification and thus is not described again here. We must simply note that the 3-bit Payload Type Identifier (PTI) is set to 1 for GFP user frames conveying far-end client signal fail indications as it is our case here. In this embodiment of the invention, the payload (last octets of the frame) does not contain specific elements. It can even be null without prejudice of status transmissions.

FIG. 2 presents a second system implementing another aspect of the invention. The units shown on FIG. 1 are still present on FIG. 2. But a new unit has been introduced, which is the bridge 3. It is typically an Ethernet switch or bridge that is capable of analyzing the address component of an Ethernet frame and making a forwarding decision based on this information. It can also support virtual LANs as described in the standard IEEE 802.1Q through insertion/removal of VIDs or forward based upon a VID. Said bridge 3 has preferably several IEEE 802.3 or IEEE 802.1Q Ethernet interfaces 9 that connect respective customer devices 11-12. It is connected to the provider device 2 over an IEEE 802.1Q Ethernet interface. That means that, for each Ethernet frame coming from a customer device 11 or 12 or getting to a port of the bridge 3 (which is normally unique per customer device), the latter inserts a predefined encapsulation or tag (VID), as defined in the standard IEEE 802.1Q, before transmitting it to the provider device 2. The inverse operation occurs when the bridge 3 receives a frame aimed at a customer device 11 or 12, that is to say it will analyze and suppress the IEEE 802.1Q encapsulation or tag (VID) before transmitting it to the right Ethernet interface 9. If the Ethernet interfaces 9 are consistent with the standard IEEE 802.1Q, the bridge 3, receiving a frame from one of these interfaces, will copy the IEEE 802.1Q encapsulation to an additional header in the frame and insert the predefined IEEE 802.1Q encapsulation header into the standard header position before transmission to the provider device 2. The frames are transported over the SONET/ SDH network 4 using a GFP encapsulation as before. But the platform 6 will now receive tagged frames that it must forward through an Ethernet IEEE 802.3 interface 10 connected to the service unit 7.

Here again, a provisioning phase is necessary. During this phase, the Ethernet interface 13 is configured to support 802.1Q tagging and GVRP signaling. The bridge 3 is provisioned with a table that correlates incoming port with VID according to the standard IEEE 802.1Q. The provider device 2 is provisioned with an Ethernet physical interface interconnecting it with the bridge 3 and is provisioned to support GVRP signaling. The provider device 2 is provisioned to establish a SONET/SDH path to the platform 6 supporting the GFP encapsulation and signaling. The provider device is also provisioned with a table that correlates incoming VID with GFP port. This table allows for one or more VIDs to be correlated with the same GFP port. The platform 6 is provisioned to establish a connection with the provider device 2 at the SONET/SDH layer providing a GFP signaling and forwarding path between the provider device and the platform. The platform Ethernet interface is provisioned with a table that correlates a GFP port with a series of VIDs. These VIDs can be identical to the ones used on Ethernet interface 13 but they also can be different. In the last case however, they must be coordinated with the provider device 2 provisioning, so that a correspondence exists between the VIDs used on both sides of the system. Finally, the service unit 7 is also provisioned with a corresponding set of VIDs and the appropriate service is provisioned onto those interfaces.

It is assumed now that a valid SONET/SDH path has been created between the provider device 2 and the platform 6 according to the provisioning rules specified above.

Figure 7:
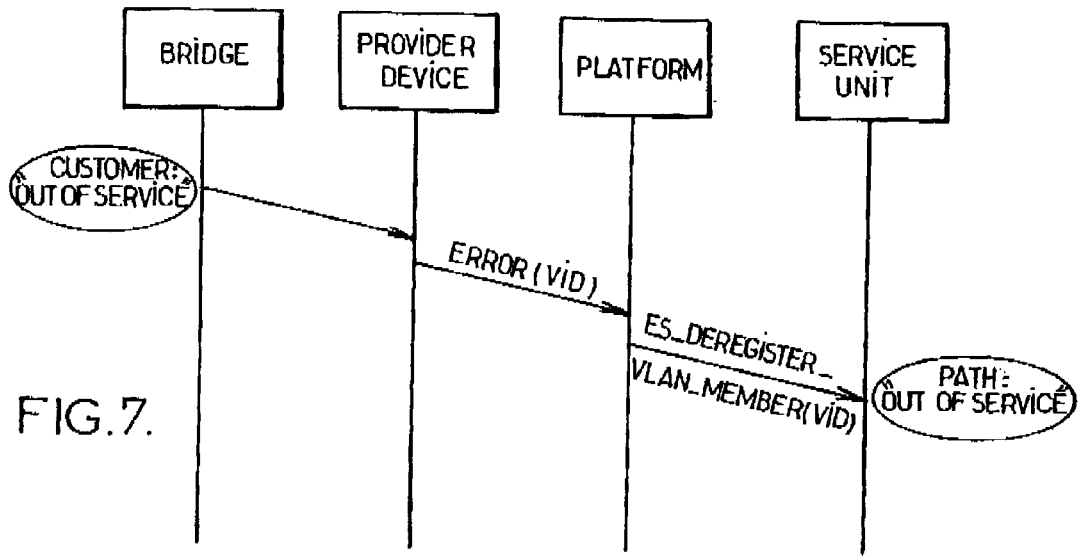
FIGS. 7 and 8 are diagrams illustrating error conditions with a system as shown on FIG. 2.

As for the previous configuration, errors can occur in any section of a path. FIG. 7 shows an example where an error occurs on an Ethernet interface 9. But an error can also follow a deliberate port deactivation from the service unit 7 as shown on FIG. 8, in order to take this port out-of-service.

Let us first consider the case of an error occurring on between an Ethernet interface 9 and the provider device 2. If, as shown on FIG. 7, the error occurs on an Ethernet interface 9, say the one connecting the customer device 11, the bridge 3 informs the provider device 2 of an error over the Ethernet interface 13. This is a part of the GVRP signaling. For example, an ES_DEREGISTER_VLAN_MEMBER (VID) message can be sent. This message contains the VID corresponding to the failed Ethernet interface 9, say VID=1. The provider device 2 receiving such error indication performs a lookup in its correlation table and looks for the GFP port associated with VID=1. Then it forwards the error indication through the retrieved GFP port over the SONET/SDH network 4 to advise the platform 6 that the connection is out-of-service. This forwarding is made by use of a GFP error indication message and includes the information VID=1. The format of such message will be discussed below. The platform 6 receives the GFP error indications and in its turn, performs a lookup in its correlation table. This lookup consists in retrieving a VID value from the received information VID=1 and the GFP port on which the GFP error indication have been received. One can note that a GFP port identifier is also available in the extension header of the GFP error indications as specified in section 6.4 of the draft T1×1.5/2000-024R3. Actually, the correspondence can be based on further identifiers carried in the GFP OA&M (Operations, Administration & Maintenance) element where configuration has been predefined. Finally the error indications are forwarded by the platform 6 to the service unit 7 over the Ethernet interface 10 in a GVRP message ES_DEREGISTER_VLAN_MEMBER (VID), containing the retrieved value of VID that will allow the service unit to identify the far-end failed Ethernet interface 9. Upon reception of this message, the service unit 7 is informed of the error and sets the corresponding Ethernet forwarding table entry (indexed by the VID) to state REMOTE_END_DOWN ensuring that the provisioned service on that port is not available.

If frames exchanged on the Ethernet interface 9 are tagged according to the standard IEEE 802.1Q, the tag will be received by the platform 6. The latter will copy it to an additional header in the frame and insert the predefined 802.1Q encapsulation header, that is to say the retrieved VID value into the standard header position.

Figure 8:
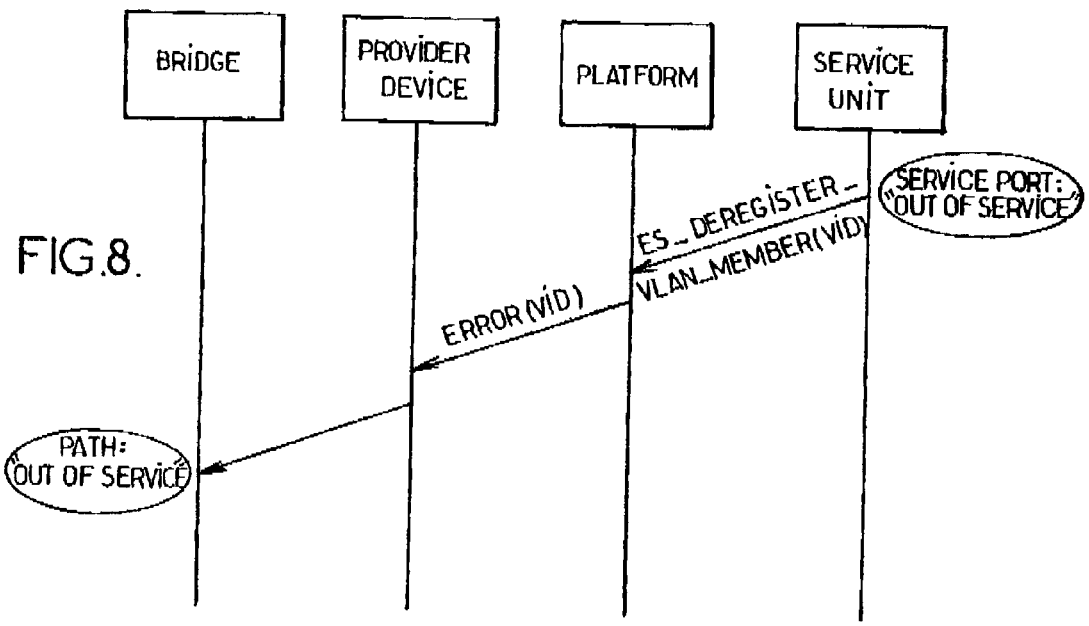

FIG. 8 shows the inverse process when the service unit 7 has initiated the error propagation. This can occur when the service unit deliberately deactivates one or more of its ports. As previously, it sends an ES_DEREGISTER_VLAN_MEMBER(VID) message, including one or more VID values, to the platform 6. The latter will perform a lookup in its table and will deduce a GFP port and a VID, say VID=1, corresponding to each received VID value. On that basis, the platform will send a GFP error indication through the retrieved GFP port to the provider device 2, which contains the information VID=1. At this stage, the provider device 2 is aware of the fact that the corresponding paths are out-of-service. The provider device 2 can finally forward the error to the bridge using GVRP signaling, for instance a ES_DEREGISTER_VLAN_MEMBER(VID), where VID value is the one received from the platform over the SONET/SDH network 4 (VID=1).

Figure 6:
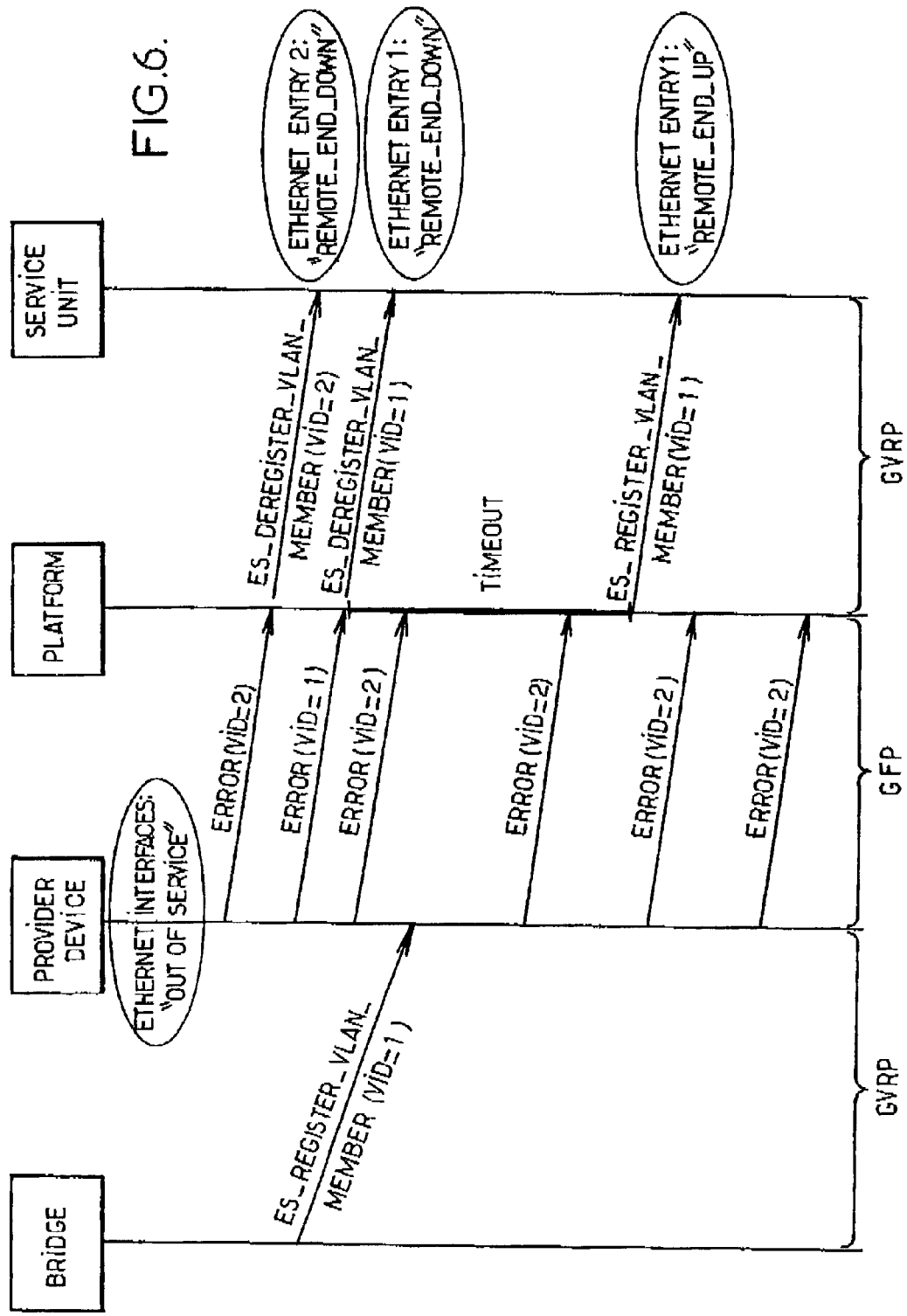
FIG. 6 is a diagram illustrating steps for establishing a connection according to the invention with a system as shown on FIG. 2.

FIG. 6 illustrates a way of establishing an end-to-end connection from the error transmission principles described above in a system configuration as shown on FIG. 2. The provider device 2 verifies that the Ethernet interface 13 facing the bridge 3 is "in-service". Until this occurs, it generates GFP error indications which will be forwarded to the platform 6 to advise it that the connection is out-of-service. In these messages, it indicates the affected VIDs. On FIG. 6 the GFP error indications contain different VIDs : VID=1 for some of them in relation to the Ethernet interface connecting the customer device 11 and VID=2 for the others in relation to the Ethernet interface connecting the customer device 12. It is also possible to transmit a list of VIDs in one GFP error message, that is in our example VID={1; 2}, thanks to a format that will be presented below. Responsive to the reception of each GFP error message at the platform, a timer, the value of which can be predetermined, is started. It is reset when a new GFP error message, including the same VIDs, is received at the platform 6. At least some of the error indications are forwarded to the service unit 7 in ES_DEREGISTER_VLAN_MEMBER(VID) messages, after a lookup in the correlation table of the platform 6 as previously described. On FIG. 6, the same values of VIDs have been used on both sides of the platform 6. This implementation is possible indeed and above all it facilitates reading of the diagram, although the values would be different in most cases so that the lookup in the correlation table of the platform 6 is required. The provider device 2 stops sending GFP error indications including for a given VID or series of VIDs responsive to reception of an ES_REGISTER_VLAN_MEMBER (VID) from the bridge 3, including said given VID or series of VIDs (VID=1 on FIG. 6). Once the provider device 2 has stopped sending GFP error indications for VID=1, the timer will expire. Upon that expiry, the platform 6 sends a GVRP message ES_REGISTER_VLAN_MEMBER (VID), including the VID values retrieved as previously described from its correlation table (VID=1 in the example), to the service unit 7. This message causes marking of REMOTE_END_UP in the service unit 7 for the corresponding Ethernet forwarding table entry ensuring that the connection is established in the uplink direction, that is from the Ethernet interface 9 connecting customer device 11 to the service unit 7.

After sending an ES_REGISTER_VLAN_MEMBER (VID) message to the service unit 7, the platform will start sending GFP error indications to the provider device 2 through the GFP port corresponding to the VID (VID=1) included in the GVRP message. The GFP error indications contain VID values retrieved from the platform correlation table. Those GFP error indications can also be sent before reception of the GVRP message, when no connection is established on the corresponding paths in the downlink direction. When the platform 6 receives one or more ES_REGISTER_VLAN_MEMBER (VID) messages from the service unit 7, including a VID corresponding to ones of the provider device 2, it stops sending GFP error indications including said retrieved VID values, to the provider device. The latter which does not receive error indications any more for those VIDs, for instance upon expiry of another timer as for the uplink, the corresponding connection can be considered as established in the downlink direction, that is from the service unit 7 to the Ethernet interface 9 connecting customer device 11. Bi-directional communication is now established and traffic can be forwarded between an Ethernet interface 9 and the Ethernet interface 10.

The GFP error indications previously mentioned in view of the system schematized on FIG. 2, are carried by classical GFP user frames. Those GFP user frames carry far-end client signal failure indications as described in section 6.3.7 of the GFP draft specification T1×1.5/2000-024R3. Payload area of such frames is shown on FIG. 9. A frame 20 is composed of two main parts: a payload header included the first octets fields and a the payload itself optionally followed by a Frame Check Sequence (FCS). Each field and its role is detailed in the GFP specification and thus is not described again here. We must simply note that the 3-bit Payload Type Identifier (PTI) is set to 1 for GFP user frames conveying far-end client signal fail indications as it is our case here. In this embodiment of the invention, the payload (last octets of the frame) contains VID values. Indeed, as described before, all the GFP error indications that are transported over the SONET/SDH network 4 contain at least a VID identifying a VLAN at least one Ethernet interface 9 belongs to. FIG. 9 gives an example of format that can be used for including VID values in such user frames. The VIDs can be included in the payload field, that can contain much information since it can carry up to 65535 octets. In an embodiment of the invention shown on FIG. 9, the payload can contain a list of VIDs as the end values of contiguous VIDs, that is to say a list of several couple of values: "VID start", "VID end", each value requiring 12 bits within the payload area. With this implementation, a GFP error indication carrying the VID values 1 and 2 can code them in the payload area by setting a VID start to 1 and a VID end to 2. If the GFP error indication carries a single VID value, say VID=1, the coding will be VID start=VID end=1. If the GFP error indication carries VIDs 1, 2 and 5 for instance, the coding will set a first VID start to 1, a first VID end to 2 and a second VID start and a VID end to 5.

The text of the abstract repeated below is hereby deemed incorporated in the description:

A platform is connected over a synchronous network using a GFP encapsulation scheme to a provider device having a first Ethernet interface with a customer device, said platform being arranged for exchanging tagged frames including a virtual LAN identifier (VID) with a service unit over a second Ethernet interface. If an error condition is detected at a GFP port of the platform, a correspondence is retrieved between said GFP port and a VID and a deregistration message including said VID is forwarded to the service unit. If an error condition is detected at the second Ethernet interface responsive to reception of a deregistration message including a VID from the service unit, a correspondence is retrieved between said VID and a GFP port and said deregistration message is forwarded through said GFP port to the provider device in a GFP error message. When several Ethernet interfaces concentrated by a bridge face the provider device, another VID is taken into account in the correspondence retrieving.

We claim:

1. A signaling method for a telecommunication system comprising a platform connected over a synchronous network using a GFP encapsulation scheme to a provider device having a first Ethernet interface with a customer device, said platform being arranged for exchanging tagged frames including a virtual LAN identifier (VID) with a service unit over a second Ethernet interface, the method comprising the following steps: detecting an error condition at a GFP port of the platform; retrieving a correspondence between said GFP port and a VID ; and forwarding a deregistration message including said VID to the service unit ; wherein the error condition is detected at a GFP port of the platform responsive to reception of at least one GFP error message from the provider device; and establishing an uplink end-to-end connection by sending a first registration message including said VID to the service unit upon expiry of a timer started responsive to reception at the GFP port of said at least one GFP error message, said expiry occurring while no further GFP error message has been received at said GFP port from the timer start.

2. A method as claimed in claim 1, further comprising the steps of:

starting sending GFP error messages from the platform to the provider device responsive to sending of said first registration message;

receiving, at the platform, a second registration message including said VID from the service unit; and establishing a downlink end-to-end connection between said first Ethernet interface and the service unit by stopping sending GFP error messages responsive to reception of said second registration message.

3. A signaling method for a telecommunication system comprising a provider device being arranged for exchanging tagged frames with a bridge arranged for exchanging frames over at least two Ethernet interfaces with respective customer devices, said tagged frames including at least one virtual LAN identifier (VID) corresponding to a respective Ethernet interface, the system further comprising a platform being connected to the provider device over a synchronous network using a GFP encapsulation scheme and said platform being arranged for exchanging tagged frames including at least one VID with a service unit over a second Ethernet Interface, the method comprising the following steps detecting an error condition an a GFP port of the platform responsive to reception from the provider device of at least one GFP error message including a first at least one VID; retrieving a correspondence between said GFP port and said first at least one VID, and a second at least one VID; and forwarding a deregistration message including said second at least one VID to the service unit; wherein the error condition is detected at a GFP port of the platform responsive to reception of at least one GFP error message including said first at least one VID from the provider device, said at least one GFP error message being sent by the provider device responsive to reception at said provider device of an error message from the bridge, including said first at least one VID; and establishing an uplink end-to-end connection by sending a first registration message including said second at least one VID to the service unit upon expiry of a timer started responsive to reception at the GFP port of said at least one GFP error message including said first at least one VID, said expiry occurring while no further GFP error message including said first at least one VID has been received at said GFP port from the timer start.

4. A method as claimed in claim 3, further comprising the steps of:
  starting sending GFP error messages including said first at least one VID through said GFP port of the platform to the provider device upon sending of said first registration message;
  receiving at the platform a second registration message including said second at least one VID from the service unit; and
  establishing a downlink end-to-end connection between the service unit and a said respective Ethernet interface corresponding to said first VID by stopping sending GFP error messages including said first at least one VID responsive to reception of said second registration message.

5. A method as claimed in claim 3, wherein said at least one GFP error message including said first at least one VID comprises a payload field including values of said first at least one VID.

6. A method as claimed in claim 5, wherein values of said first at least one VID are coded as a list of coupled values of VID start and VID end values.

7. A platform for a telecommunication system comprising a provider device having a first Ethernet Interface with a customer device, said provider device being connected to said platform over a synchronous network using a GFP encapsulation scheme and said platform being arranged for exchanging tagged frames including a virtual LAN identifier (VID) with a service unit over a second Ethernet Interface, the platform comprising: a detector for detecting an error condition at a GFP port; a correspondence table for retrieving a correspondence between said GFP port and a VID; and means for forwarding a deregistration message including said VID to the service unit ; wherein the error condition is detected at a GFP port of the platform responsive to reception of at least one GFP error message from the provider device; and means for establishing an uplink end-to-end connection by sending a first registration message including said VID to the service unit upon expiry of a timer started responsive to reception at the GFP port of said at least one GFP error message, said expiry occurring while no further GFP error message has been received at said GFP port from the timer start.

8. A platform as claimed in claim 7, wherein the error condition is detected at a GFP port of the platform responsive to reception of at least one GFP error message from the provider device.

9. A platform as claimed in claim 8, further comprising means for establishing an uplink end-to-end connection by sending a first registration message including said VID to the service unit upon expiry of a timer started responsive to reception at the GFP port of said at least one GFP error message, said expiry occurring while no further GFP error message has been received at said GFP port from the timer start.

10. A platform as claimed in claim 7, further comprising:
  means for starting sending GFP error messages to the provider device responsive to sending of said first registration message;
  means for receiving a second registration message including said VID from the service unit; and
  means for establishing a downlink end-to-end connection between said first Ethernet Interface and the service unit by stopping sending GFP error messages responsive to reception of said second registration message.

11. A platform for a telecommunication system comprising a provider device arranged for exchanging tagged frames with a bridge having at least two Ethernet interfaces with respective customer devices, said tagged frames including at least one virtual LAN identifier (VID) corresponding to a respective Ethernet Interface, the provider device being connected to the platform over a synchronous network using a GFP encapsulation scheme and said platform being arranged for exchanging tagged frames including at least one VID with a service unit over a second Ethernet interface, the platform comprising :
  a detector for detecting an error condition at a GFP port responsive to reception from the provider device of at least one GFP error message including a first at least one VID; a correspondence table for retrieving a correspondence between said GFP port and said first at least one VID, and a second at least one VID; and means for forwarding a deregistration message including said second at least one VID to the service unit; and means for establishing an uplink end-to-end connection by sending a first registration message including said second at least one VID to the service unit upon expiry of a timer started responsive to reception at the GFP port of said at least one GFP error message including said first at least one VID, said expiry occurring while no further GFP error message including said first at least one VID has been received at said GFP port from the timer start.

12. A platform as claimed in claim 11, further comprising means for establishing an uplink end-to-end connection by sending a first registration message including said second at least one VID to the service unit upon expiry of a timer started responsive to reception at the GFP port of said at least one GFP error message including said first at least one VID, said expiry occurring while no further GFP error message including said first at least one VID has been received at said GFP port from the timer start.

13. A platform as claimed in claim 11, further comprising:
  means for starting sending GFP error messages including said first at least one VID to the provider device responsive to sending of said first registration message;
  means for receiving a second registration message including said second at least one VID from the service unit; and
  means for establishing a downlink end-to-end connection between the service unit and a said respective Ethernet interface corresponding to said first VID by stopping sending GFP error messages including said first at least one VID responsive to reception of said second registration message.

14. A platform as claimed in claim 11, wherein said GFP error messages including said first at least one VID comprise a payload field including values of said first at least one VID respectively.

15. A platform as claimed in claim 14, wherein values of said first at least one VID are coded as a list of coupled values of VID start and VID end values.

16. A provider device for a telecommunication system comprising a platform connected to the provider device over a synchronous network using a GFP encapsulation scheme, said provider device being arranged for exchanging tagged frames with a bridge having at least two Ethernet Interfaces with respective customer devices, said tagged frames including at least one virtual LAN identifier (VID) corresponding to a respective Ethernet interface, the provider device comprising: means for receiving at least one error message including at least one VID from the bridge; a correspondence table for retrieving a correspondence between said at least one VID and at least one GFP port; means for forwarding said at least one error message in at least one GFP error message including said at least one VID, through said at least one GFP port to the platform over said synchronous network ; and wherein an error condition is detected at a GFP port of the platform responsive to reception of at least one GFP error message from the provider device; and means for establishing an uplink end-to-end connection by sending a first registration message including said VID to a service unit upon expiry of a timer started responsive to reception at the GFP port of the platform of said at least one GFP error message, said expiry occurring while no further GFP error message has been received at said GFP port of the platform from the timer start.

17. A provider device as claimed in claim 16, wherein said at least one GFP error message including said at least one VID comprise a payload field including values of said at least one VID respectively.

18. A provider device as claimed in claim 17, wherein values of said at least one VID are coded as a list of coupled values of VID start and VID end values.

\* \* \* \* \*